United States Patent
Patterson

(10) Patent No.: US 12,543,886 B1
(45) Date of Patent: Feb. 10, 2026

(54) THERMAL SERVING STATION FOR COUNTERTOP

(71) Applicant: Tyler R. Patterson, Lancaster, PA (US)

(72) Inventor: Tyler R. Patterson, Lancaster, PA (US)

(\*) Notice: Subject to any disclaimer, the term of this patent is extended or adjusted under 35 U.S.C. 154(b) by 814 days.

(21) Appl. No.: 17/879,940

(22) Filed: Aug. 3, 2022

Related U.S. Application Data

(60) Provisional application No. 63/228,735, filed on Aug. 3, 2021.

(51) Int. Cl.
*A47J 36/24* (2006.01)
*A47B 13/12* (2006.01)
*A47B 33/00* (2006.01)
*F25B 21/02* (2006.01)

(52) U.S. Cl.
CPC .......... *A47J 36/2483* (2013.01); *A47B 13/12* (2013.01); *A47B 33/00* (2013.01); *F25B 21/02* (2013.01)

(58) Field of Classification Search
CPC ........ F25B 21/02; A47B 33/00; A47J 36/2483
See application file for complete search history.

(56) References Cited

U.S. PATENT DOCUMENTS

| | | | |
|---|---|---|---|
| 1,361,299 A * | 12/1920 | Baseman | A47B 33/00 108/25 |
| 4,899,027 A | 2/1990 | Wong | |
| 5,718,124 A * | 2/1998 | Senecal | A47F 3/0443 62/3.6 |
| 5,767,488 A * | 6/1998 | Barger | H05B 6/645 99/332 |
| 5,782,094 A | 7/1998 | Freeman | |
| 5,860,281 A | 1/1999 | Coffee et al. | |
| 6,281,480 B1 * | 8/2001 | Haberstetter | F24C 15/108 219/452.12 |
| 6,301,901 B1 | 10/2001 | Coffee et al. | |
| 8,188,410 B2 | 5/2012 | Dean et al. | |
| 8,857,346 B2 | 10/2014 | Khanjian et al. | |
| 10,667,637 B2 | 6/2020 | Goodson et al. | |
| 10,905,268 B2 * | 2/2021 | Goodson | F25D 31/007 |
| 11,609,121 B2 * | 3/2023 | Bassill | G01K 1/026 |
| 12,241,761 B2 * | 3/2025 | Eckert | G01D 5/145 |

(Continued)

FOREIGN PATENT DOCUMENTS

| | | | | |
|---|---|---|---|---|
| CN | 117414024 A | * | 1/2024 | ........... A47B 83/045 |
| KR | 20200013876 A | * | 2/2020 | ............. F25D 29/00 |

*Primary Examiner* — Woody A Lee, Jr.
(74) *Attorney, Agent, or Firm* — Cramer Patent & Design, PLLC.; Aaron R. Cramer

(57) ABSTRACT

A thermal serving station for a countertop is a device by which hot or cold locations are built into a countertop to keep food warm or cold. A temperature rated glass plate houses either a heating coil or a refrigerant based refrigeration system is provided and is operated by electric power. Additional components are located in the cabinets below the countertop. Certain areas may provide both heating and cooling depending on the user's needs. Insulation under the countertop protects nearby materials from excessive temperature variations. The device is bordered by a trim ring and provides integral LED lighting as well. The lighting will glow red for a hot area and blue for a cold area. The device is controlled by a digital touch screen or by wireless link to a smart phone thus providing a smooth countertop area.

2 Claims, 4 Drawing Sheets

(56) References Cited

U.S. PATENT DOCUMENTS

2015/0153049 A1\* 6/2015 Jacob ................... F24C 7/083
                                                        219/490
2018/0100658 A1\* 4/2018 Chavan ................ H05B 6/1263

\* cited by examiner

THERMAL SERVING STATION FOR COUNTERTOP

RELATED APPLICATIONS

The present invention is a continuation of U.S. Provisional Application No. 63/228,735 filed on Aug. 3, 2021, the entire disclosures of which are incorporated herein by reference.

FIELD OF THE INVENTION

The present invention relates generally to a selective heating and cooling station installed within a countertop of a residence.

BACKGROUND OF THE INVENTION

It can be safely said that most people rely upon a stove or range to heat food in a kitchen. Likewise, a refrigerator is relied upon to keep food cold or even frozen. However, there is a great deal of time during food serving and consumption, where food is away from such appliances, yet needs to remain hot and cold, or at least warm or cool. In most times, these food products remain on a countertop, while being served from, or may remain in place during a buffet. Some of these time periods may last hours or more, in which the safety of the food for consumption may become questionable. Even if safe to eat, the food is anything but tasty to eat due to its warm or cold taste.

Accordingly, there exists a need for a means by which food containers can be automatically kept hot or cold, depending on their nature, while sitting on a countertop. The use of the present invention allows for the temperature maintenance of food for long periods of time while being served and/or consumed in a manner which is quick, easy and effective.

SUMMARY OF THE INVENTION

The principles of the present invention provide for a thermal serving station which has a serving area which has a plurality of heating stations and a plurality of cooling stations—the heating stations and the cooling stations each contain a heating and cooling area and a heating and cooling control panel, a heat producing mechanism and a cool producing mechanism environmental communicating with the heating and cooling area of the heating stations and the cooling stations, an electrical supply routed from a power source to the heat producing mechanism and the cool producing mechanism, and a control station providing selective control to the heat producing mechanism and the cool producing mechanism.

The heating and cooling areas may be made of a material providing quick and efficient thermal transfer. The heating and cooling areas may be made of a temperature-rated glass plate. The heating and cooling area may provide thermal transfer to an item placed thereon. The item may be selected from the group consisting of a plate, a dish, or a glass. The heating stations and the cooling stations may be mounted on a countertop such that a top surface of the heating and cooling areas may be flush with a top surface of the countertop. The heating stations and the cooling stations may be mounted on the countertop such that the top surface of the heating and cooling areas may be within the top surface of the countertop.

The heating and cooling area may be provided with an illuminated activation border that serves to define a plurality of exterior physical limits of the heating and cooling area as well as indicate potential heat via a RED color or potential cold via a BLUE color. The heating and cooling control panel may be provided with a heat control area and a cool control area. The heat control area is provided with a heat increase touch area and a heat decrease touch area. The cool control area is provided with a cool increase touch area and a cool decrease touch area. The heating and cooling control panels may be in electrical communication with each of the heat producing mechanisms and each of the cool producing mechanism. The heating stations and the cooling stations therefore depend downward into a shared serving station interior. The heating stations and the cooling stations therefore depend downward on an isolated serving station interior.

The heat producing mechanism is an electrical resistance heating means while the cool producing mechanism is a heats refrigerant-based refrigeration system. The heat producing mechanism is a Peltier thermoelectric heat pump while the cool producing mechanism is a chemical based refrigeration system. The heating stations and the cooling stations, the heat producing mechanism and the cool producing mechanism are in fluid communication via a plurality of heating/cooling means delivery/return lines which are in a sealed and continuous loop. The heating stations and the cooling stations may be controlled by a communications technology selected from the group consisting of a wireless link technology, a Bluetooth technology, a Wi-Fi technology, or proprietary radio frequency sent from a personal electronic device. The personal electronic device may be selected from the group consisting of a cellphone, a computer tablet, or a proprietary remote control. The heat producing mechanism may be in electrical communication with the heating stations and the cooling stations via a plurality of electrical wiring.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
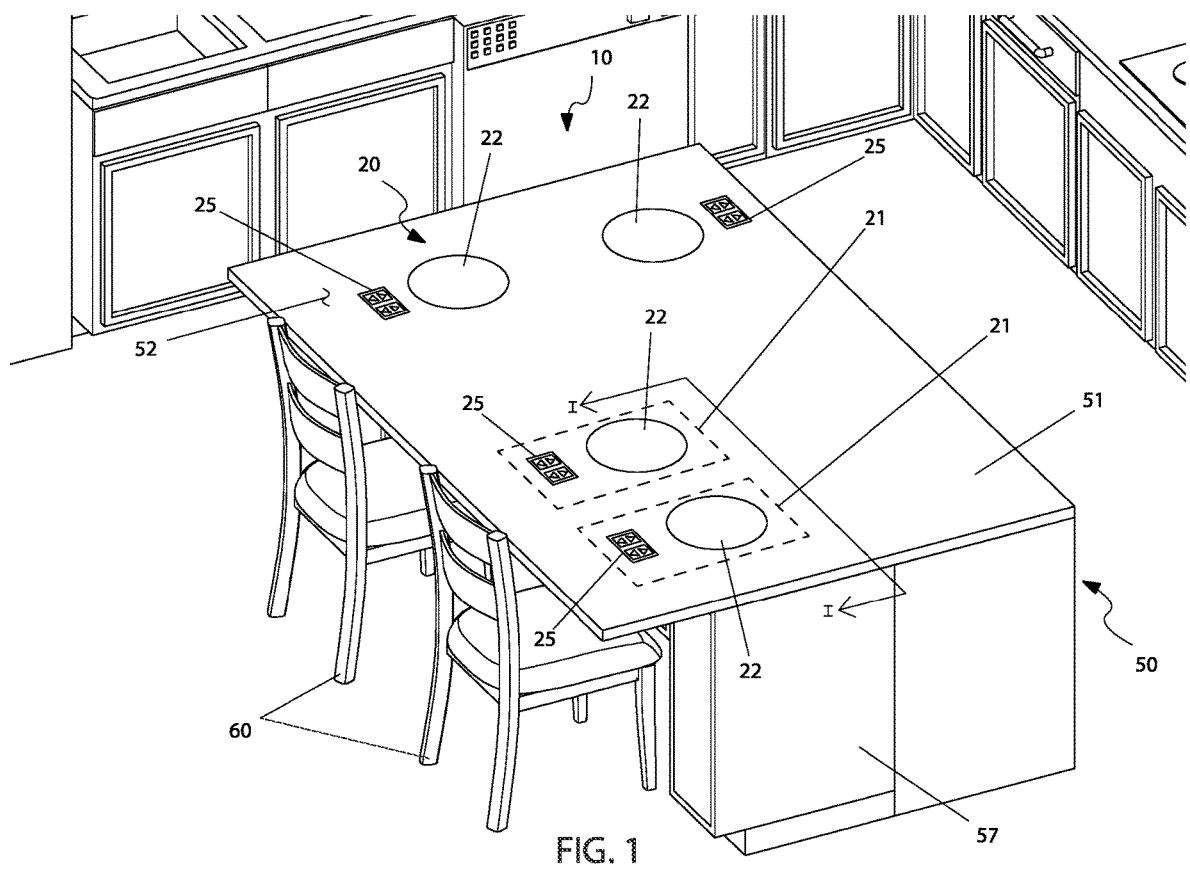
FIG. 1 is an environmental view of a thermal serving station as installed within a countertop of an island within a kitchen, according to the preferred embodiment of the present invention.

DESCRIPTIVE KEY 10 thermal serving station
11 heat producing mechanism
12 cool producing mechanism
13 electrical supply
15 heating/cooling means delivery/return lines
16 electrical wiring 20 serving area
21 heating and cooling station
22 heating and cooling area
25 heating and cooling control panel
50 island
51 countertop
52 overhang
53 serving station interior
54 compartment interior
57 compartment
60 chair
65 wireless link
70 personal wireless device
75 illuminated activation border
80 heat control area
85 cool control area
90 heat increase touch area
95 heat decrease touch area
100 cool increase touch area
105 cool decrease touch area
110 main control circuit
115 Bluetooth® transceiver
120 bi-color light emitting diodes (LED's)

1. Description of the Invention

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

The present invention relates to a thermal serving station (herein referred to as the "station") 10, that provides user selectivity to either provide a heat producing mechanism 11 or a cool producing mechanism 12 directly to a serving area 20. Referring now to FIG. 1, it is shown that such a serving area 20 is preferably installed within a countertop 51 of an island 50 in a kitchen. However, the station 10 is not limited to installments and such locations. Other locations where instantaneous and selective thermal control for a serving area 20 can be utilized, such as a dining area, a bathroom, a bar, end table, coffee table, dining table, picnic table, and outdoor locations, among others, are envisioned. such as any other countertop 51 location. FIG. 1 also illustrates a more desired location for the station 10, such as installed within a countertop 51 on an island 50 adjacent to but not interfering with a range top or other appliances. The desired location can be next to a seating area with at least one (1) chair 60 and also preferably near an overhang 52 of the countertop 51 and easily accessible by occupants of the chairs 60. Although illustrated herein as a serving area 20, it is appreciated that the amount of serving areas 20 can be variable due to the desired and available installation areas.

As is illustrated in FIG. 1, a preferred embodiment of the station 10 would include a serving area 20 that would contain at least one (1), but preferably more, heating and cooling stations 21. The heating and cooling stations 21 each contain a heating and cooling area 22 preferably of a circular design, and a heating and cooling control panel 25. Both the heating and cooling areas 22 are preferably of a circular design, and a heating and cooling control panel 25 will be described in greater detail herein below. The heating and cooling areas 22 each are preferably a material capable of providing quick and efficient thermal transfer similar to that of an electric range top (e.g., a temperature-rated glass plate) and is capable of being cleaned in a similar manner. Each heating and cooling area 22 is of a diameter capable of providing thermal transfer to an item placed thereon, such as a plate, dish, or glass. Each heating and cooling area 22 of the respective heating and cooling station 21 is in environmental communication with a heat producing mechanism 11 and a cool producing mechanism 12. Each heating and cooling control panel 25 is in electrical communication with each respective heat producing mechanism 11 and each cool producing mechanism 12.

Figure 2:
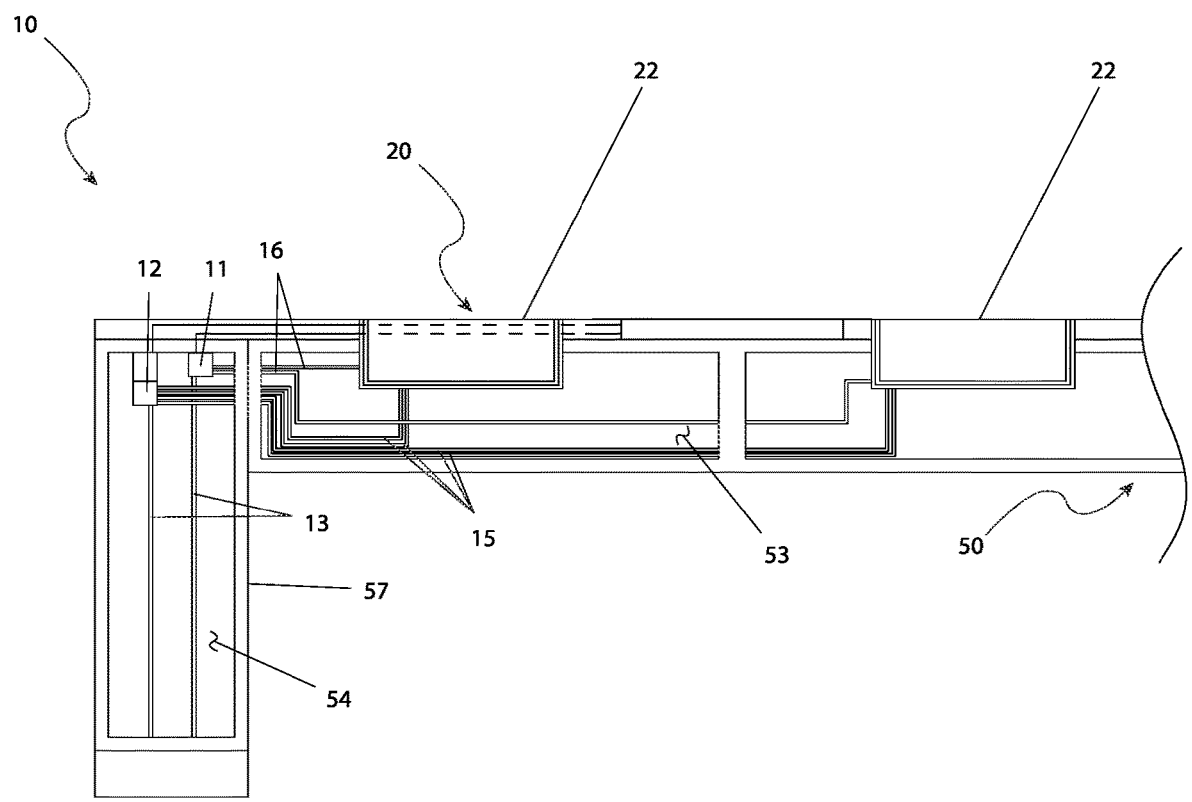
FIG. 2 is a cross-sectional view of the thermal serving station, according to the preferred embodiment of the present invention.

Referring now more closely to FIG. 2, it is shown in an exemplary embodiment a graphical illustration of the station 10. Generally speaking, the heating and cooling stations 21 are mounted on or within the countertop 51 such that the top surfaces of the heating and cooling areas 22 are flush with the top surface of the countertop 51. The aforementioned described components of the heating and cooling stations 21 therefore depend downward into a shared or isolated serving station interior 53. The island 50 incorporates a compartment 57 that has a compartment interior 54. Mounted to or housed within the compartment interior 54 is the heat producing mechanism 11 and a cool producing mechanism 12. The heat producing mechanism 11 may be an electrical resistance heating means while the cool producing mechanism 12 may be a heats refrigerant-based refrigeration system. However, it is noted that other types of heat and/or cool producing means such as a Peltier thermoelectric heat pump, chemical-based system, or the like can be used with the present invention. As such the use of any particular type of heat producing mechanism 11 and a cool producing mechanism 12 is not intended to be a limiting factor of the present invention.

An electrical supply 13 is routed from a power source to both the heat producing mechanism 11 and the cool producing mechanism 12. The heat producing mechanism 11 is in electrical communication with one (1) or more heating and cooling stations 21 via electrical wiring 16. For heating or cooling the heating and cooling station(s) 21, the heat producing mechanism 11 and a cool producing mechanism 12 are in fluid communication via a heating/cooling means delivery/return lines 15 which are in a sealed and continuous loop. It is envisioned that the thermal transfer is directed to the heating and cooling areas 22 of each respective heating and cooling station 21, although the entire serving area 20 may experience varying amounts of heat transfer. The control station 40 provides selective control to the heat producing mechanism 11 and cool producing mechanism 12.

Referring now back to FIG. 1, the exemplary embodiment illustrates the heating and cooling control panels 25 located centered and adjacent to each respective heating and cooling areas 22 and easily accessible and identifiable to an occupant of a chair 60 located adjacent thereto. The heating and cooling control panels 25 will be described in greater detail herein below.

Other embodiments of the station 10 would include insulation located in the serving station interior 53 or compartment interior 54 to protect nearby materials from excessive temperature variations. Another embodiment envisioned includes control of each individual heating and cooling stations 21 by wireless link 65, such as Bluetooth®, Wi-Fi, proprietary radio frequency (RF) frequency, or the like, to a personal electronic device 70, such as a personal electronic device, such as a telephone, a computer tablet, a proprietary remote, or the like, wherein so that there is no physical embodiment of the control station 40 thus providing a smooth countertop 51 area, or to provide additional or supplemental control of the station 10 with respect to the heating and cooling control panels 25. Still yet another embodiment would provide for the entire serving areas 20 to experience the thermal transfer as controlled by the control station 40. When not in use, the serving areas 20 may be used as a standard countertop 51.

Figure 3:
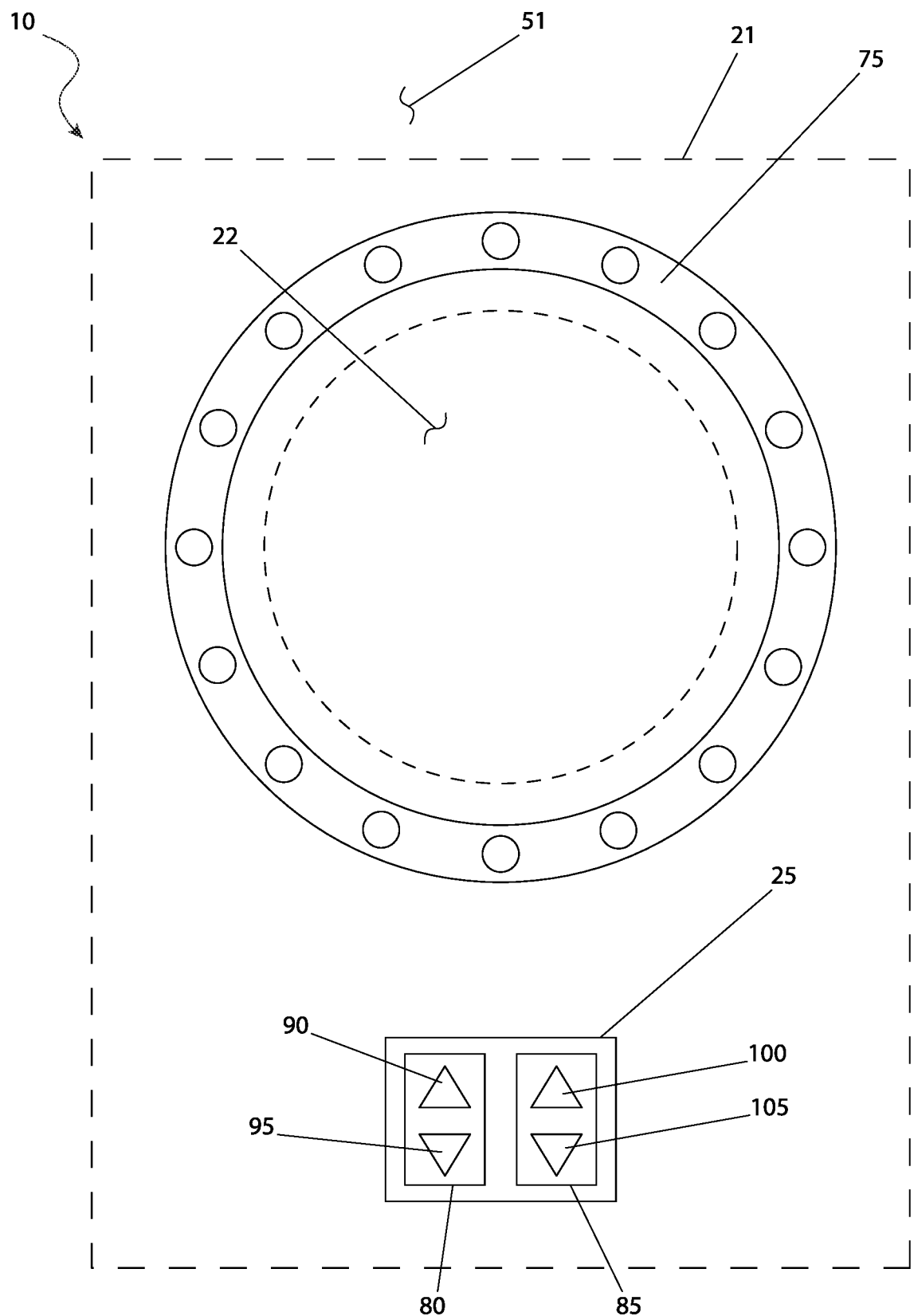
FIG. 3 is a detailed view of the heating and cooling station(s) as used with the thermal serving station, according to the preferred embodiment of the present invention.

Referring now to FIG. 3, a detailed view of the heating and cooling stations 21 as used with the thermal serving station 10, according to the preferred embodiment of the present invention is disclosed. The heating and cooling stations 21 each provide a heating and cooling area 22 and an associated heating and cooling control panel 25. The size of the heating and cooling area 22 can be of any desired size, but it is envisioned that it would be no larger than six inches (6 in.) in diameter. The border of the heating and cooling area 22 is provided with an illuminated activation border 75. The illuminated activation border 75 serves to define the exterior physical limits of the heating and cooling area 22 as well as indicate potential heat via a RED color or potential cold via a BLUE color. Each associated heating and cooling control panel 25 is provided with a heat control area 80 and a cool control area 85. Respectively, each heat control area 80 is provided with a heat increase touch area 90 and a heat decrease touch area 95. Likewise, each cool control area 85 is provided with a cool increase touch area 100 and a cool decrease touch area 105. The heat increase touch area 90, the heat decrease touch area 95, the cool increase touch area 100, and the cool decrease touch area 105 are of a smooth area such that they are easy to wipe clean, do not provide the possibility of electrical shock, and are flush with the surface of the countertop 51. The heat increase touch area 90, the heat decrease touch area 95, the cool increase touch area 100, and the cool decrease touch area 105 are in electrical communication with heat producing mechanism 11 and the cool producing mechanism 12, (both of which as are shown in FIG. 2), and whose further functionality will be described in greater detail herein below.

In a typical use of the exemplary embodiment of the invention, any items desired to be heated or maintain warmth can be placed on the heating and cooling area 22 of the desired heating and cooling station 21 of the desired serving area 20. After ensuring that power is supplied to the heat producing mechanism 11 via the electrical supply 13 and any necessary portions of the station 10 are switched on, the user can control the temperature of the heating and cooling area 22 via the heating and cooling control panels 25 via electrical activation of the heat producing mechanism 11. Upon activation, the respective heating and cooling areas 22 will be illuminated via the illuminated activation border 75 in a highly visible RED color. Any items desired to be cooled or maintain cool temperatures can be placed on the heating and cooling areas 22 of the desired heating and cooling station 21 of the desired serving area 20. After ensuring that power is supplied to the cool producing mechanism 12 via the electrical supply 13 and any necessary portions of the station 10 are switched on, the user can control the temperature of the heating and cooling area 22 via the heating and cooling control panel 25 via electrical activation of the cool producing mechanism 12. Upon activation, the respective heating and cooling area 22 will be illuminated via the illuminated activation border 75 in a highly visible BLUE color.

Figure 4:
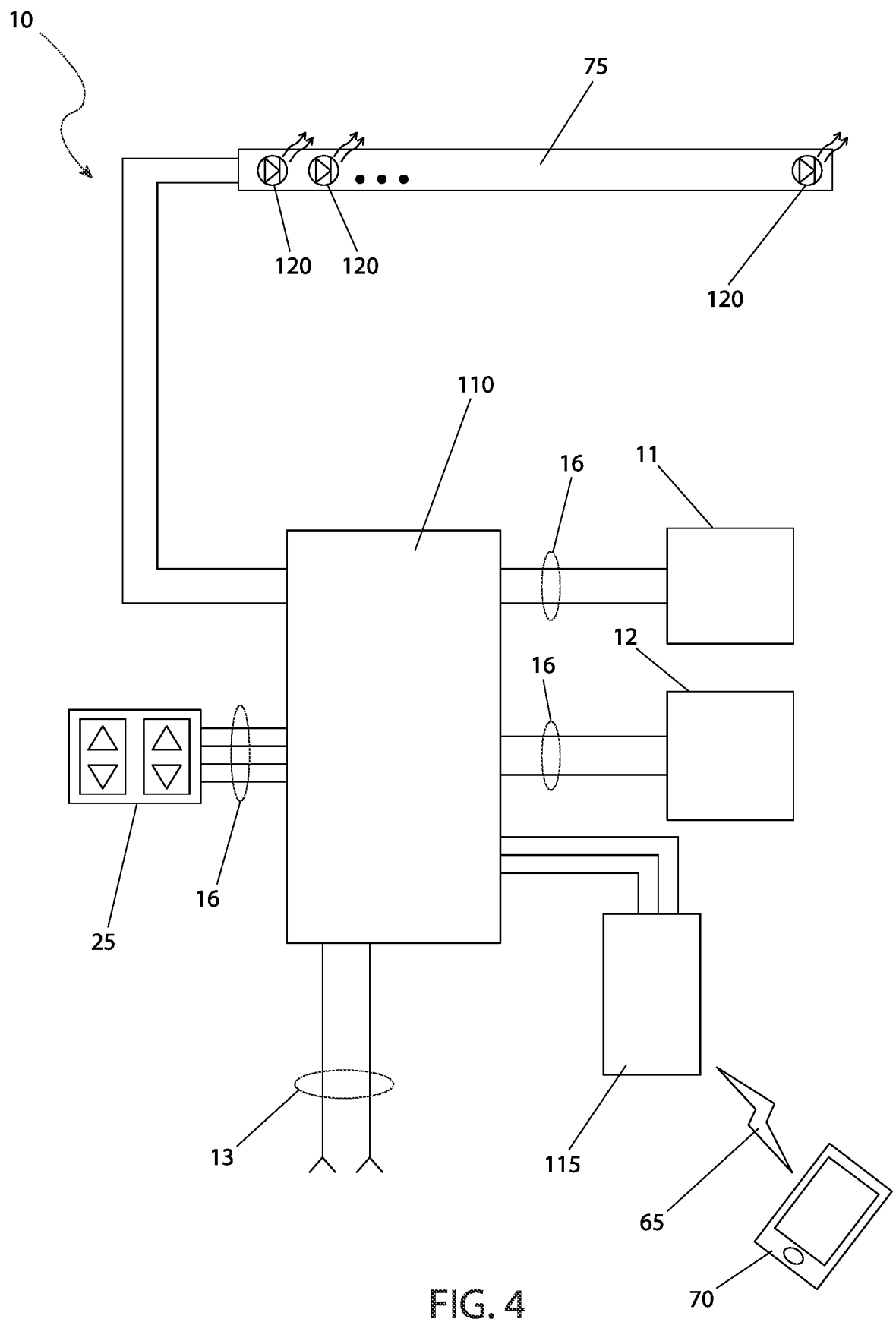
FIG. 4 is an electrical block diagram of the thermal serving station, according to the preferred embodiment of the present invention.

Referring to FIG. 4, an electrical block diagram of the station 10, according to the preferred embodiment of the present invention is depicted. Electrical power is provided via the electrical supply 13 to a main control circuit 110. The main control circuit 110 receives input commands from the heating and cooling control panels 25 including the heat control area 80 and a cool control area 85, along with the heat increase touch area 90, heat decrease touch area 95, the cool increase touch area 100, and the cool decrease touch area 105, all of which are aforementioned described in FIG. 3. Additionally, a Bluetooth® transceiver 115 may supply input and output commands via the wireless link 65 to a personal wireless device 70. An output from the main control circuit 110 is provided to the heat producing mechanism 11 and the cool producing mechanism 12 via electrical wiring 16. An output from the main control circuit 110 is also provided to the illuminated activation border 75. The illuminated activation border 75 includes multiple bi-color light emitting diodes (LED's) 120 capable of producing RED or BLUE visible colors as determined by the operating mode of the main control circuit 110.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A thermal serving station comprising:
   a serving area mounted within a countertop, the serving area having a plurality of heating stations and a plurality of cooling stations, each heating station and each cooling station including a heating and cooling area that is flush with an upper surface of the countertop and an associated heating and cooling control panel;
   a heat producing mechanism and a cool producing mechanism disposed within an interior compartment below the countertop, each heating and cooling area being in thermal communication with the heat producing mechanism and the cool producing mechanism through a plurality of sealed and continuous heating and cooling delivery and return lines;
   an electrical supply routed from a power source to the heat producing mechanism and the cool producing mechanism; and,
   a main control circuit in electrical communication with the heat producing mechanism, the cool producing mechanism, and each heating and cooling control panel; and,
   wherein each heating and cooling area comprises a temperature-rated glass plate bordered by an illuminated activation border that defines exterior physical limits of the heating and cooling area and selectively illuminates in a red color when the heating station is active and in a blue color when the cooling station is active;

wherein each heating and cooling control panel comprises a heat control area and a cool control area, the heat control area including a heat increase touch area and a heat decrease touch area, and the cool control area including a cool increase touch area and a cool decrease touch area, all of which are flush with the countertop surface; and, wherein the main control circuit is further configured to receive wireless input commands via a communications technology selected from the group consisting of Bluetooth, Wi-Fi, or proprietary radio frequency, the wireless input commands being transmitted from a personal electronic device selected from the group consisting of a cellphone, a computer tablet, or a remote control.

2. The thermal serving station of claim 1, wherein the heat producing mechanism comprises an electrical resistance heating means and the cool producing mechanism comprises a refrigerant-based refrigeration system, and wherein the compartment further includes insulation surrounding the heat producing mechanism and the cool producing mechanism to protect adjacent structural materials from temperature variation.

* * * * *